UNITED STATES PATENT OFFICE.

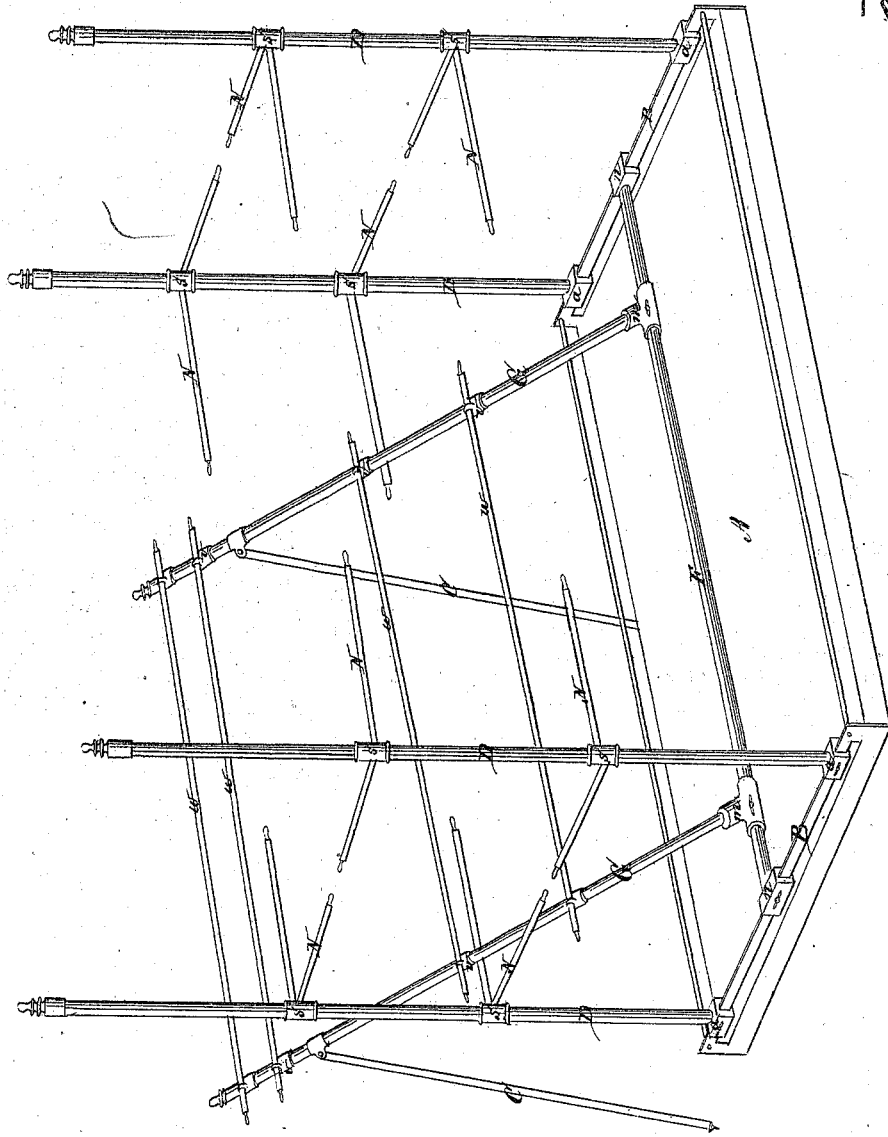

JOSEPH R. PALMENBERG, OF NEW YORK, N. Y.

IMPROVEMENT IN STANDS FOR SHOW-WINDOWS.

Specification forming part of Letters Patent No. 120,825, dated November 14, 1871.

*To all whom it may concern:*

Be it known that I, JOSEPH R. PALMENBERG, of New York, in the county and State of New York, have invented certain Improvements in Stands for Show-Windows, of which the following is a specification:

My invention consists in the arrangement of two or more guides, B, on a suitable frame or platform, A, upon which said guides slides $a\ a$ and $n\ n$ are fitted, capable of moving on the guides B, and secured in any desired place by means of suitable bolts or screws.

To the slides $a\ a$ upright posts or bars D are securely fastened, to which slides $s$ are fitted, provided with projecting rods N, upon which the articles exposed for show are placed. These rods N can be turned in any direction, and the slides $s$ may be moved in any position on the posts D and secured in the same by suitable set-screws. Instead of fastening the guides B to a frame or platform, A, the same may be fastened to the frame of the window. The guides $n\ n$ are connected with a bar, F, upon which slides $m\ m$ are fitted, capable of moving on the bar F. The slides $m\ m$ have rods G G attached, near the upper ends of which rods C C are hinged, whose lower ends are provided with sharp points to support the rods G G in any desired inclination. To the rods G G small sliding brackets $v\ v$ are fitted, secured in their desired position by suitable set-screws, upon which said brackets rods $w\ w$ are supported, on which the show-goods are hung or suspended.

By this arrangement of a show-stand the upright posts D may be moved in any desired position, according to the nature of the goods or articles to be exposed for show, and the bar F together with the rods G may be for the same purpose moved further forward or backward, as may be desired, and the position of all the rods N N or of the bars $w\ w$ fixed and regulated, as may be desired.

What I claim as my invention, and desire to secure by Letters Patent, is—

The combination of the guides B, upright posts D with movable rods N, sliding-bar F with the movable rods G, supporting-bars $w$, and provided with hinged rods C, substantially as and for the purpose hereinbefore set forth.

JOSEPH R. PALMENBERG.

Witnesses:
A. H. NONES,
HENRY E. ROEDER.

(54)